United States Patent [19]

Finnigan

[11] Patent Number: 5,684,862
[45] Date of Patent: Nov. 4, 1997

[54] TELEPHONE VOICE MESSAGE STORE AND FORWARD METHOD

[75] Inventor: Paul F. Finnigan, Saratoga, Calif.

[73] Assignee: Advance Systems Development Company, L.C.

[21] Appl. No.: 449,266

[22] Filed: May 24, 1995

[51] Int. Cl.$^6$ .................................................. H04M 1/64
[52] U.S. Cl. ........................... 379/88; 379/207; 379/220
[58] Field of Search ............................. 379/207, 69, 88, 379/89, 211, 212, 219, 220

[56] References Cited

U.S. PATENT DOCUMENTS

| | | | |
|---|---|---|---|
| 4,757,525 | 7/1988 | Matthews et al. | 379/89 |
| 4,790,003 | 12/1988 | Kepley et al. | 379/88 |
| 4,933,967 | 6/1990 | Lo et al. | 379/207 |
| 5,014,300 | 5/1991 | Harvath et al. | 379/100 |
| 5,029,199 | 7/1991 | Jones et al. | 379/89 |
| 5,274,696 | 12/1993 | Perelman | 379/89 |
| 5,406,557 | 4/1995 | Baudoin | 379/89 |

OTHER PUBLICATIONS

"Voice Mail Internetworking Using X.400", Shivji and Johansen, *Message Handling Systems*, Elsevier Science Publishers B.V., North Holland, 1991, pp. 113–122.

"Networked Voice Messaging", Vaudreuil, *Connexions*, vol. 8, No. 11, Nov. 1994, U.S., pp. 25–27.

"Audio Messaging Interchange Specification (AMIS)— Analog Protocol," Version 1, Feb. 1990, Information Industries Association, Washington, D.C.

"Audio Messaging Interchange Specification (AMIS)— Digital Protocol," Version 1, Feb. 1990, Information Industries Association, Washington, D.C.

Message Transport and Routing Service Technical Service and Architecture Description Bellcore, Special Report SR-INS-002662 Issue 1, May, 1993.

*Primary Examiner*—Fan Tsang
*Attorney, Agent, or Firm*—Stoel Rives LLP

[57] ABSTRACT

A voice message store and forward service (20) includes voice message store and forward units ("VMSFUs") that intercommunicate by employing a protocol A for transferring voice messages between VMSFUs with user information transfer units that include the voice message and a message envelope containing enhanced feature information, and service information transfer units that include notifications of successful and/or unsuccessful transfer of a user message. An originating VMSFU (22) accepts a voice message from a voice message system (16), delivers the voice message to a destination VMSFU (24), and/or returns a delivered or not delivered notification to the voice message system. The destination VMSFU delivers the voice message to a voice message system (18) identified by a destination mailbox indicated in a voice message header. Protocol A conveys enhanced features, such as conveying unique features of disparate voice message systems, converting message formats or voice encoding algorithms, translating and mapping addresses, and accommodating message priorities. VMSFUs assign each voice message a globally unique message identification number for tracing message progress, reporting on message delivery status, and providing accounting information. The store and forward service provides services, such as delivering voice messages at a specified time, redirecting voice messages to alternate VMSFUs, deferring delivery of specified voice messages, delivering voice messages in accordance with specified priority and delivery commitments, and minimizing message delivery costs with a scheduler.

16 Claims, 4 Drawing Sheets

TELEPHONE VOICE MESSAGE STORE AND FORWARD METHOD

TECHNICAL FIELD

This invention relates to telephonic voice message systems, sometimes referred to as voice mail systems, and, in particular, to a method of controlling transmission of telephonic voice message data in interconnected networks of such systems.

BACKGROUND OF THE INVENTION

Electronic communication may be conducted employing a variety of formats including direct telephonic voice communication, facsimile document communication, electronic mail communication, and telephonic voice message communication. Facsimile document communication and electronic mail communication may be characterized as document-based and the other two formats as voice-based.

Direct telephonic voice communication is unique among these formats in that it requires contemporaneous participation by all parties. In many business situations, the requirement for contemporaneous participation is unnecessary, disruptive, time-consuming, and often impossible because a called party telephone is busy or the party is otherwise unavailable. As a consequence, the noncontemporaneous communication formats of facsimile document communication, electronic mail communication, and telephonic voice message communication are becoming preferred over direct telephonic voice communication for many situations.

Because ever-increasing volumes of information are being transmitted by the different noncontemporaneous communication formats, document store and forward systems have been developed to improve the efficiency, cost-effectiveness, and useability of facsimile document and electronic mail communications formats. Document store and forward systems implement features such as delivering a single communication to multiple parties, deferring communication delivery to a reduced rate time period, deferring a communication delivery until business hours in a different country or time zone, forwarding a communication to a predetermined address, returning a communication delivery notification, verifying and/or authenticating a particular communication, and delivering a particular communication according to a delivery priority.

Document-based store and forward systems, such as one described in U.S. Pat. No. 5,014,300 for METHOD AND APPARATUS FOR ACCESSING A FACSIMILE STORE AND FORWARD NETWORK, have been readily developed because facsimile machines and electronic mail systems are based on digital communication technology that is intended for transmitting messages among widely separated locations, often across international boundaries. The communication receiving facsimile machines and computers are manufactured by a variety of manufacturers according to internationally accepted features, standards, and communication protocols that were developed to satisfy a common need.

In contrast, voice-based store and forward systems have not been readily developed because prior voice mail systems were primarily intended for transmitting messages among users in a common location, such as a corporation. Therefore, voice mail systems have been manufactured by a variety of manufacturers, each adopting a proprietary set of features and communication protocols that were developed to satisfy the needs of each manufacturer.

Clearly, voice-based store and forward systems would benefit from the features and capabilities of document-based store and forward systems. However, the many different protocols employed by voice message systems hinder the development of such a capability.

What is needed, therefore, is a communication method suitable for intercommunicating among and rendering compatible the features of multiple disparate voice-based message systems and voice message store and forward units distributed across a geographically separated communications network.

SUMMARY OF THE INVENTION

An object of this invention is, therefore, to provide a method of storing and forwarding voice messages.

Another object of this invention is to provide a method of conveying voice messages between disparate types of voice message systems.

A further object of this invention is to provide a method of generating a voice message in an originating voice message system, storing the voice message in a store and forward service, and conveying the voice message across a geographical boundary to a destination voice message system.

This invention is directed to a method of controlling the transmission of voice messages and related information via telephonic voice message systems interconnected by a voice message store and forward service. In a preferred embodiment, a store and forward service includes a georgaphically distributed network of voice message store and forward units ("VMSFUs") that intercommunicate by employing a protocol A that transfers voice messages between VMSFUs with user information transfer units that include the voice message and a message envelope containing enhanced feature information, and service information transfer units that include notifications of successful and/or unsuccessful transfer of a user message. An originating VMSFU accepts a voice message from a voice message system, delivers the voice message to a destination VMSFU, and/or returns a delivered or not delivered notification to the voice message system. The destination VMSFU delivers the voice message to a voice message system identified by a destination mailbox indicated in a voice message header. Protocol A conveys enhanced features, such as conveying any unique features of disparate voice message systems, converting between message formats or voice encoding algorithms, translating addresses, mapping message recipient addresses, and accommodating message priorities. VMSFUs attach to each voice message a globally unique message identification number for tracing message progress, reporting on message delivery status, and providing accounting information. The store and forward service provides services, such as delivering voice messages at a specified time, redirecting voice messages to alternate VMSFUs, deferring delivery of specified voice messages, delivering voice messages in accordance with specified priority and delivery commitments, and minimizing message delivery costs with a scheduler.

Additional objects and advantages of this invention will be apparent from the following detailed description of a preferred embodiment thereof, which proceeds with reference to the accompanying drawings.

DETAILED DESCRIPTION OF PREFERRED EMBODIMENT

Figure 1:
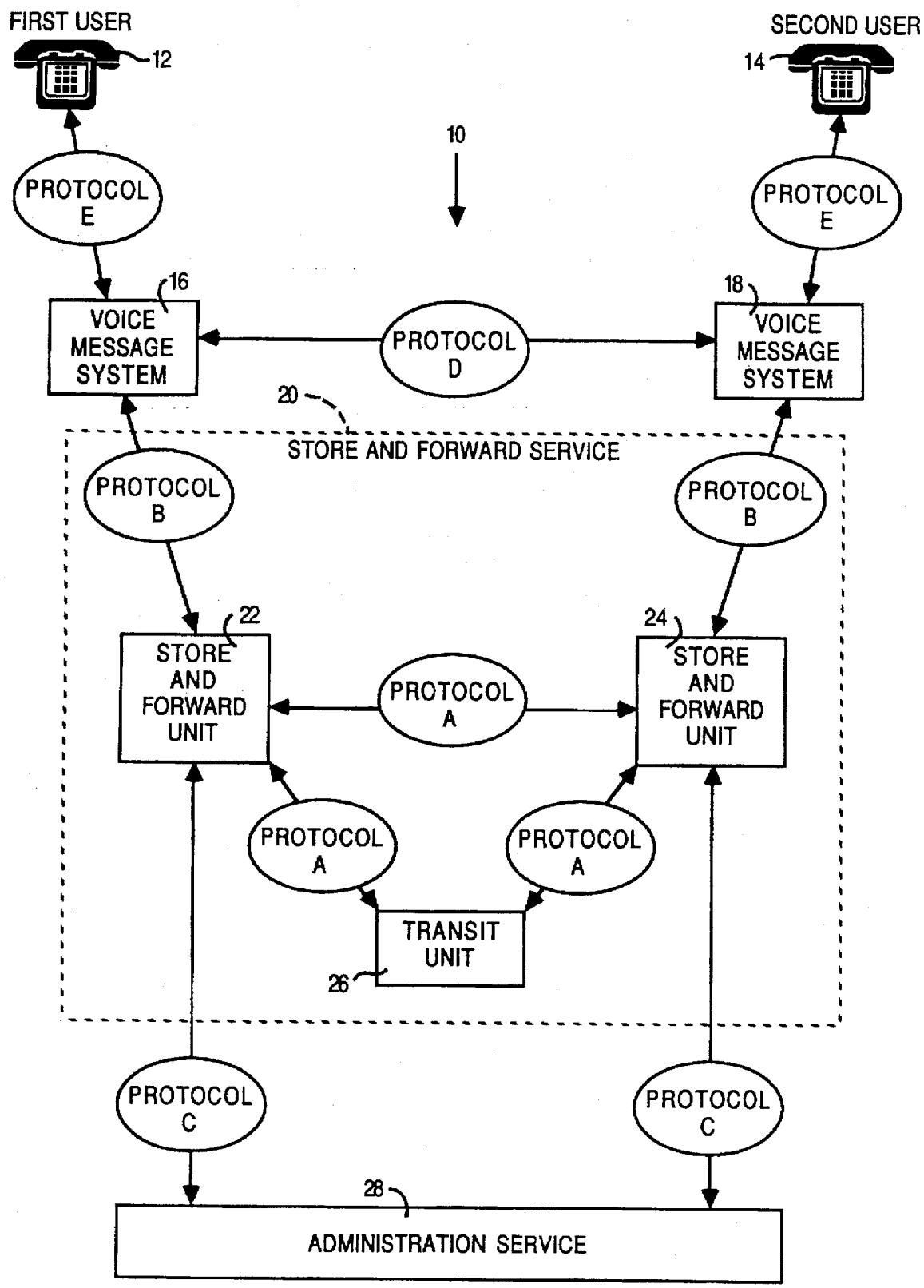
FIG. 1 is a simplified block diagram of a network of telephones, voice message systems, a store and forward service, and an administration service showing various communication interconnections and their associated protocols.

FIG. 1 shows a telecommunications network 10 including telephones 12 and 14 connected to respective voice message systems 16 and 18. Human users (not shown) employ telephones 12 and 14 to store and receive voice messages in voice message systems 16 or 18. Of course, each of voice message systems 16 and 18 may include multiple telephones 12 and 14.

Telephones 12 and 14 employ a conventional protocol E to communicate with respective voice message systems 16 and 18. Protocol E includes voice message information and dual-tone modulation frequency ("DTMF") command information that a user employs to control a particular voice message system. Protocol E typically varies from manufacturer to manufacturer of voice message systems.

A store and forward service 20, also referred to as a gateway, includes voice message store and forward units ("VMSFU") 22 and 24 and typically a transit unit 26, which is an intermediate communications node that accepts voice messages from one VMSFU and routes them to another VMSFU or to another transit unit. It is common for VMSFUs 22 and 24 to be located on opposite sides of an geographical boundary, such as a city, county, state, or international boundary.

For direct intercommunication, voice message systems 16 and 18 may employ a protocol D, such as the protocol described in applicant's copending U.S. patent application Ser. No. 08/332,102, filed Oct. 31, 1994 for TELEPHONIC VOICE MESSAGE TRANSMISSION CONTROL METHOD.

Voice message systems 16 and 18 employ a protocol B to communicate with respective VMSFUs 22 and 24. Protocol B is described below with reference to FIGS. 2, 4, and 5.

VMSFUs 22 and 24 employ a protocol A to communicate with each other, with other VMSFUs (not shown), and with transit unit 26. Protocol A is described with reference to FIGS. 2 and 3.

Either of VMSFUs 22 and 24 may be an originating VMSFU that has accepted a voice message from respective voice message systems 16 and 18. By accepting the voice message, the originating VMSFU assumes responsibility for delivering the voice message and/or returning a delivered or not delivered notification to the originating voice message system.

In like manner, either of VMSFUs 22 and 24 may be a destination voice message store and forward unit that is responsible for delivering a received voice message to the voice message system identified by a destination mailbox indicated in a voice message header.

VMSFUs 22 and 24 communicate with an administration service 28 by employing a digital protocol C that is described with reference to FIG. 2.

Store and forward service 20 employs protocols A and B to convey voice messages between voice message systems 16 and 18. In this regard, VMSFUs 22 and 24 and transit unit 26 each have the same general responsibilities when conveying voice messages. In particular, the possibly unique feature sets of each voice message system 16 and 18 must be conveyed through telecommunications network 10 to avoid loss of any service features or quality, and store and forward service 20 should enhance service by providing, for example, a conversion service between message formats or voice encoding algorithms, address translation, and feature set conversion, such as mapping a larger number of recipients into a number of allowed subsets and accommodating message priority differences.

VMSFUs 22 and 24 attach to each voice message a globally unique message identification number useable for tracing message progress, reporting on message delivery status, and providing accounting information.

Store and forward service 20 provides additional requirements and services, such as storing voice messages for a predetermined amount of time before returning a negative acknowledgment to the originating voice message system, delivering a particular voice message to a specified voice message system at a specified time, redirecting a voice message to another VMSFU, deferring delivery of a specified voice message, and recognizing and delivering voice messages in accordance with any priority and associated delivery commitments attached to each voice message. Of course, consideration is given to the cost of message delivery. For example, store and forward service 20 may intentionally delay conveying a voice message in order to group it with other voice messages to take advantage of network utilization or minimize connection costs. Such delays take into consideration any message priority and delivery commitments.

Store and forward service 20 is generally cognizant of the costs of message delivery and, therefore, minimizes costs by using a scheduler referred to as a "traffic shaper." Because store and forward service 20 employs shared facilities and supports multiple voice message systems, the overall cost of voice message delivery is reduced for all users.

Store and forward service 20 may also provide an authentication service that positively identifies the source and destination voice message systems. Other privacy services, such as encryption, may mask the content of the voice message, its destination address, and the addresses of any additional recipients.

Store and forward service 20 may impose additional requirements on voice message systems 16 and 18. For example, VMSFU 22 may include a "pull message" command that retrieves from voice message system 16 messages addressed to a user of voice message system 18, a message retransmission feature may be required to support recovery of voice messages interrupted during transmission, and an information response feature may be required such that mail box status, message transfer status, system authentication, version identification, and voice identification can be returned to a requesting resource.

Voice identification employs returning to the message originating user a predetermined number of seconds of the recipient's voice. This voice response is optionally provided by the destination voice message system or by a directory service provided by administration service 28.

Figure 2:
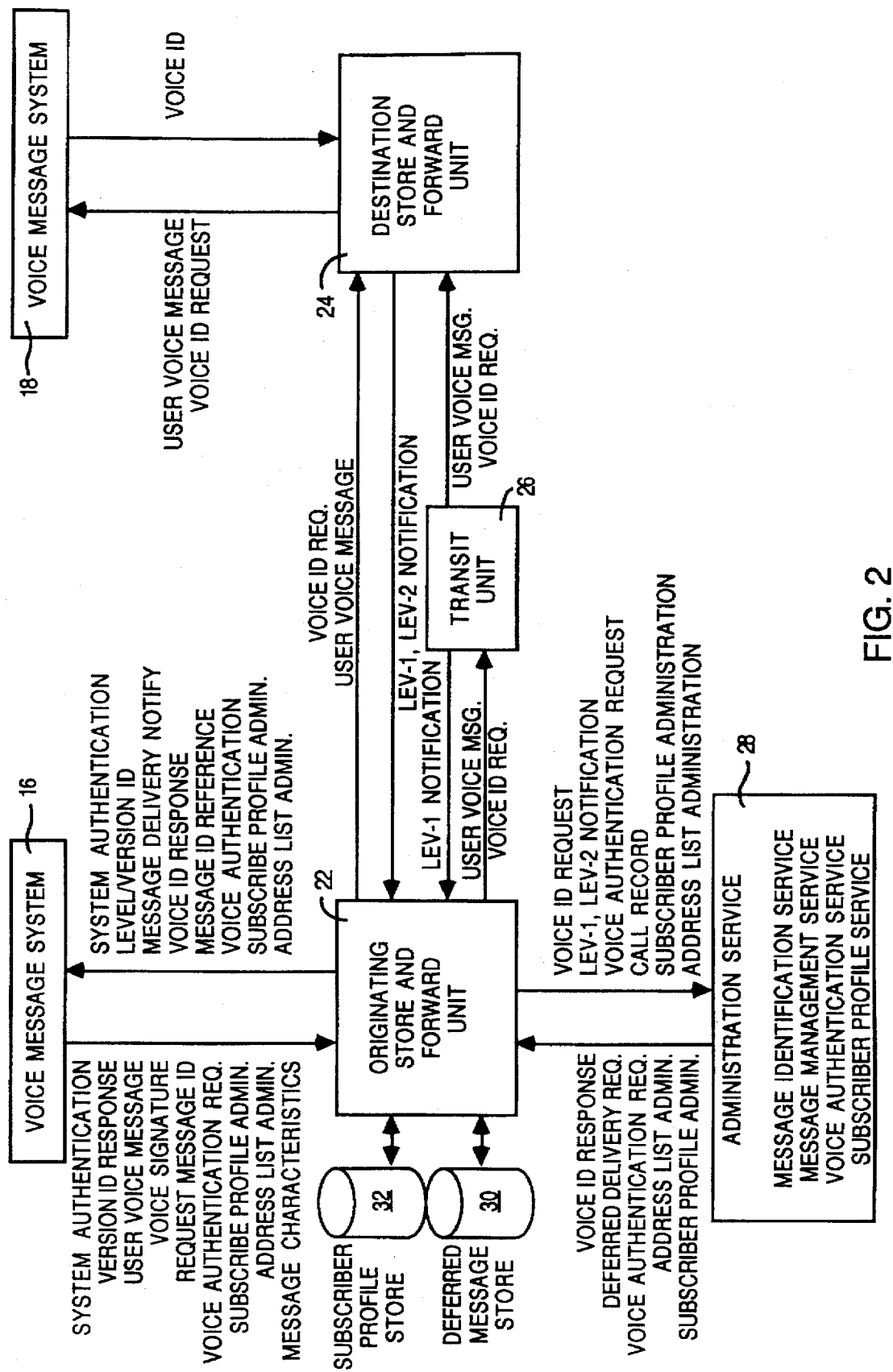
FIG. 2 is a simplified block diagram of a pair of voice message systems intercommunicating among a pair of store and forward units, a transit unit, and an administration service showing a flow of various voice message and protocol information types.

FIG. 2 shows some typical information types conveyed by protocols A, B, and C in telecommunications network 10 from the standpoint of originating voice message system 16 and originating VMSFU 22. Originating VMSFU 22 serves as an interface to other services provided by administration service 28, such as message identification, message management, voice identification, authentication and authorization, and subscriber profile maintenance.

The specified services place several functional requirements on originating VMSFU 22. For example, a deferred message store 30 is required for storing voice messages awaiting deferred delivery. Likewise, a subscriber profile store 32 retains user address lists, defines user preferences, and provides instructions for filtering, forwarding, and deferring voice message deliveries. The user preferences are retained on a per-subscriber basis, where a subscriber is defined as any entity having an address that can be identified by VMSFU 22, that is, a subscriber may be an individual recipient, a voice message system, or a corporate entity.

Protocol A is used to transfer user information transfer units and service information transfer units between VMSFUs 22 and 24 and transit unit 26. In general, information transfer units are multi-part messages exchanged between two units in which the receiving unit may not take action on an information transfer unit until all parts of the message have been successfully received.

A user information transfer unit is a user message including a voice message and a message envelope containing additional information.

A service information transfer unit is administrative- or service-related information such as, for example, notifications indicating successful and/or unsuccessful transfer of responsibility for a user message to either destination VMSFU 24 (level 1) or to the voice message recipient (level 2).

Protocol A is employed within a generalized voice message store and forward unit network. That is, VMSFUs 22 and 24 are part of a larger telecommunications network. For this reason, protocol A includes notification, status, and other functions that enable other VMSFUs in the network to learn about the presence of newly added VMSFUs, thereby permitting the added units to be introduced within the existing network.

Protocol A is transport and message exchange independent. That is, skilled workers will recognize that protocol A may be based on well-known message exchange protocols including the International Telecommunications Union ("ITU") X.400, Audio Messaging Interchange Specification Digital ("AMIS-D") with extensions, MIME, and SMTP.

Protocol A preferably includes data fields to transfer information including:
- a service announcement that notifies other VMSFUs that a particular VMSFU is available for service;
- a request for and reply to the details of any message delivery systems attached to a particular VMSFU;
- a request for and reply to accounting information;
- configuration update information enabling a centralized administrator to modify and update configuration information stored at the VMSFU; and
- authentication and validation information that requires an administration to identify itself for validation before VMSFU 22 surrenders accounting information or permits viewing and updating configuration information.

Figure 3:
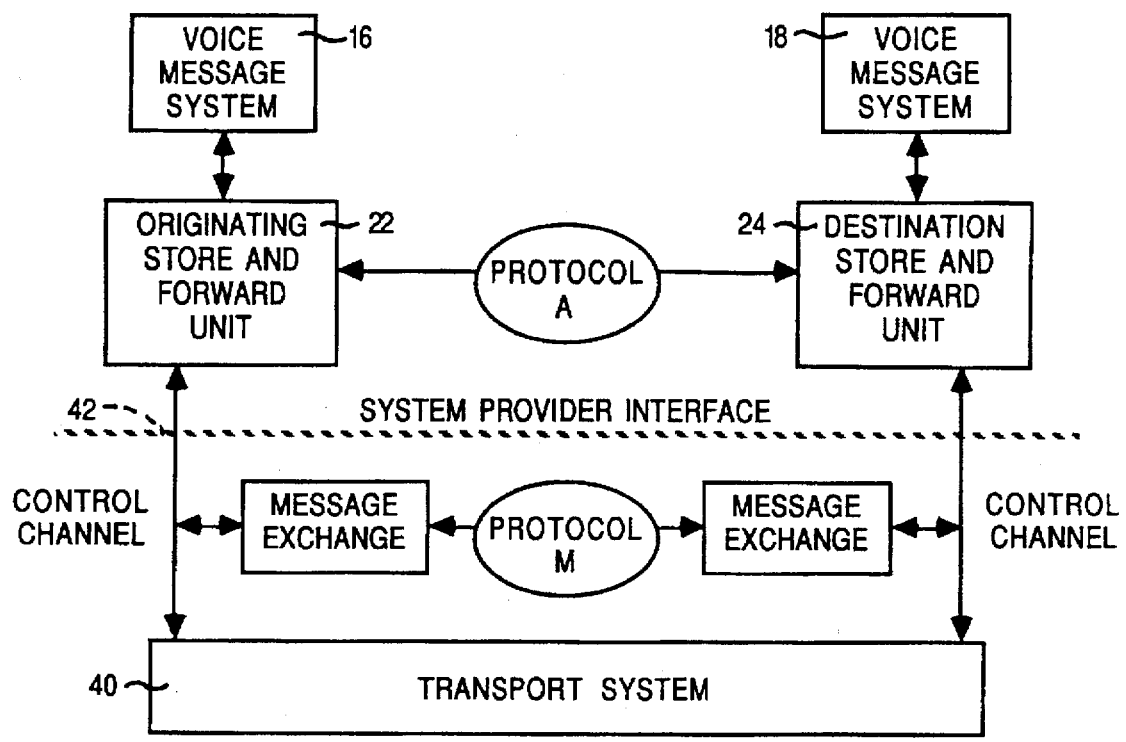
FIG. 3 is a simplified block diagram of a pair of voice message systems, a pair of store and forward systems, a system provider interface, and a control channel showing the interconnection pathways and protocols A and M employed to exchange message and control information.

FIG. 3 shows the preferred architecture for protocol A, which embeds protocol A in a digital message-based protocol M that also implements a control channel. The control channel portion of protocol M employs a transport system 40 that is a communication system for delivering non-voice data, control information, and message-related service information transfer units to a specified destination. The service information transfer units include, for example, service announcement requests and responses, security-related service information, and accounting information.

Transport system 40 may be based on the well-known internet TCP/IP or OSI protocol layers one to four. Alternatives for implementing protocol A and message protocol M include ITU X.400 protocol, AMIS-D with extensions, MIME, and SMTP, with ITU X.400 being preferred.

A service provider interface 42 provides to VMSFUs 22 and 24 functions including voice message delivery and a system management control channel.

Protocol A enables VMSFUs 22 and 24 to send and receive the following service information transfer units from another VMSFU or transit unit 26. Level 1 notification, level 2 notification (message delivery notification), voice identification request, service announcement request, accounting information (also referred to as a call record), and system authentication.

Because protocol A is a digital, message-based protocol, the messages are preferably formatted into fields. The preferred format for protocol A service information transfer unit messages is:

| FI | FUN | MOD | R | DATA |
|----|-----|-----|---|------|

Where:
FI Is a format indicator, i.e., a field indicating protocol A data unit.
FUN Is a function code specifying a type of service information transfer unit.
MOD Is a modification field further defining the function.
R Is a field indicating whether the specified service information transfer unit is a request or a response.
DATA Is an optional data field, the length of which is a function of the values of FUN and MOD.

Using protocol A between VMSFUs 22 and 24 enables meeting the voice message store and forward interconnection requirements described below.

In general, in the interconnection of VMSFUs, the responsibility for delivering single- and multi-address voice messages originates at an originating VMSFU, such as 22, and is transferred to one or more destination VMSFUs, such as 24.

The basic units of communication among VMSFUs are the above-described user and service information transfer units.

There is one type of user information transfer unit that includes the user voice message and the message envelope, which includes additional information, such as the recipient's address.

There are two types of service information transfer units, a level 1 notification and a level 2 notification. A level 1 notification indicates the successful and/or unsuccessful transfer of responsibility for a voice message from originating VMSFU 22 to destination VMSFU 24. A level 1 notification conveys the information associated with the successful or unsuccessful transfer of responsibility on a per-recipient basis. Table 1 lists the preferred contents of the level 1 notification.

TABLE 1

Contents of level 1 notification

Common field
original message identifier
originator address
recipient address
original encoded information types
converted encoded information types
Successful transfer field
last transfer time
Unsuccessful transfer field
reason code
diagnostic code A level 2 notification indicates the successful or unsuccessful delivery of the responsibility for and delivery of a voice message to recipient address at voice message system 18. Responsibility is transferred to a user by transmission of the voice message to either a voice message system or a storage device empowered to receive messages for a voice message recipient. Table 2 lists the preferred contents of the level 2 notification.

TABLE 2

Contents of level 2 notification

Common field
original message identifier
originator address
recipient address
last encoded information types
store and forward unit reference
Successful delivery field
time of delivery to recipient address
receiving terminal identifier
duration of the message
duration of delivery
Unsuccessful delivery field
reason code
diagnostic code
last attempt time
number of attempts
duration of the message Level 1 notification is preferably required for all message transfers, whereas level 2 notification is conditional upon receiving a "certified class of service" indication. Classes of service are described below.

Information transfer units are preferably transferred between VMSFUs 22 and 24 with protocol data units defined in ITU X.400.

The encoded voice message portion of the user information transfer unit is encoded in a 16-, 24-, 32-, or 40-kilobit-per-second adaptive differential pulse code modulation format with 32 kilobits per second being preferred. Voice encoding may employ 16-kilobit-per-second low delay code excited linear prediction techniques.

VMSFUs 22 and 24 preferably transfer recipient addresses employing an originator/recipient address format defined in ITU F.401.

Messages are transferred between VMSFUs 22 and 24 by employing commercially available transit facilities that are available subject to agreement of the commercial service providers involved.

A voice message may pass through transit facilities consisting of a VMSFU or some other transfer system. If voice messages are routed using transit facilities, the transit facility preferably supports level 1 notification.

If a message contains multiple recipient addresses, the transit facility should accept responsibility for some recipient addresses and transfer the responsibility for other recipient addresses to one or more VMSFUs or transit facilities.

A preferred classification for a set of interworking requirements for elements of store and forward service 20 is shown in Table 3.

TABLE 3

Interworking Requirements of Service Facilities

| Service Facility Requirement | ORIG | TRANS | DEST |
| --- | --- | --- | --- |
| Single Address Message | M | M1 | M |
| Multiple Address Message | C | M1 | M |
| Address List Codes | C | N/A | N/A |
| Message Identification | M | M | M |
| Class of Service - Urgency | M | M1 | M |
| Class of Service - Delivery | C | M1 | M |
| Message Deferral | C | N/A | N/A |
| Message Envelope | C | N/A | N/A |
| Successful Message Transfer (positive level 1 notification) | C | M | M |
| Unsuccessful Message Transfer (negative level 1 notification) | M | M | M |
| Successful Message Delivery (positive level 2 notification) | C | C | C |
| Unsuccessful Message Delivery (negative level 2 notification) | C | C | C |
| Voice Format Conversion | C | N/A | C |

Where:

M Is mandatory.

M1 Is mandatory, but when the transit facility does not accept responsibility for message delivery, the service facility is conveyed.

C Is conditional.

N/A Is not applicable.

ORIG Is an originating VMSFU.

TRANS Is a transit facility.

DEST Is a destination VMSFU.

The address of a voice message is the telephonic network address specifying the intended destination of the voice message. The address is preferably an international direct distance dialing number.

For a single address voice message, a single international direct distance dialing number is supported by VMSFUs 22 and 24. Likewise, for a multiple address voice message, a corresponding number of international direct distance dialing numbers are supported by VMSFUs 22 and 24.

Expansion of address lists is performed at originating VMSFU 22.

Upon successfully submitting a voice message, originating VMSFU 22 assigns the globally unique identification number to the voice message. Identification numbers are used to identify voice messages in notifications conveyed between VMSFUs.

Regarding classes of service, urgent and normal delivery classes and private and certified message service classes are preferably supported between VMSFUs 22 and 24. In the case of a private message, destination VMSFU 24 forwards the private message only to the destination specified in the message envelope. In the case of a certified message, destination VMSFU 24 provides a delivery notification to originating VMSFU 22.

The message envelope is transferred from originating VMSFU 22 to destination VMSFU 24. The preferred contents of the message envelope are listed in Table 4.

TABLE 4

Message Envelope Contents

| Field<br>Voice Signature Field | Provided by<br>O/D (Note) |
|---|---|
| Recipient information | |
| address (box number) | O |
| organization | O |
| organizational unit(s) | O |
| physical address lines | O |
| voicemail network address | O |
| Message information | |
| Total duration in minutes | D |
| Number of sub messages | D |
| Class of service - Urgency | O |
| Class of service - Delivery | O |
| Submission date and time | O |
| Message reference | O |
| Originator Information | |
| address (box number) | O |
| organization | O |
| organizational unit(s) | O |
| physical address lines | O |
| voicemail network address | O |

Where:
O=Provided by originating VMSFU
D=Provided by destination VMSFU
Note: Provisions for a voice signature capability are arranged by a bilateral agreement.

Regarding notifications of successful or unsuccessful message transfers, a level 1 notification includes information indicating the successful and/or unsuccessful acceptance of responsibility for the message on a per-recipient basis. A level 1 notification that contains only information regarding unsuccessful transfer is generated on a per-recipient basis by either destination VMSFU 24 or the transit facility upon determining that responsibility for the voice message cannot be accepted or transferred.

A level 1 notification of successful transfer is preferably returned only when requested and is processed on a per-recipient basis.

An unsuccessful message transfer is indicated on a per-recipient basis by negative level 1 notifications.

Regarding notifications of successful or unsuccessful message deliveries, a positive level 2 notification indicates successful message delivery and is returned to the originating VMSFU on a per-recipient basis. A level 2 notification of successful message delivery is returned only when requested and is on a per-recipient basis.

A negative level 2 notification indicates an unsuccessful message delivery and is returned to the originating VMSFU on a per-recipient basis.

The quality of the voice message as received from originating voice message system 16 should not be adversely affected by passing the voice message through any VMSFU, any transit facility, or any transmission facility positioned between VMSFUs.

If a voice message is interrupted during delivery from destination VMSFU 24 to destination voice message system 18, subsequent attempts to deliver the voice message will retransmit the entire message.

Protocol B is employed to transfer user information transfer units and service information transfer units, such as address list administration data, message identification requests, and voice identification requests between voice message systems 16 and 18 and respective VMSFUs 22 and 24.

Figure 4:
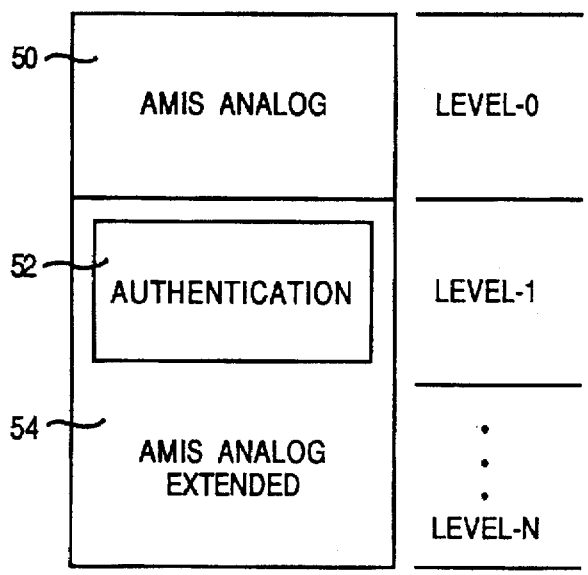
FIG. 4 is a simplified block diagram showing a protocol B architecture of this invention.

FIG. 4 represents the architecture of protocol B, which is an analog protocol based on functionality extensions to the well-known AMIS-Analog ("AMIS-A") protocol 50 (level 0). Protocol B extends the functionality of AMIS-A by adding authentication features 52 (level 1) and extended voice messaging services 54 (level 2 to level N) that support VMSFU functions.

Protocol B supports various levels of compliance with AMIS-A through a bidirectional level/version exchange between a VMSFU and its associated voice message system, which identifies the protocol version supported by each resource to be employed in a voice message transfer.

Protocol B requirements are grouped by architecture, voice message, and security categories with each category being related to a different class of service. When initiating a voice message, a level/version identification service information transfer unit indicates which classes of service and versions are supported by store and forward service 20 and the particular VMSFU, such as 22. It is necessary that the voice message system accept and deliver user information transfer units. The different protocol levels provide different degrees of service. For example, level 0 is basic AMIS-A 50, level 1.0 is AMIS-A 50 plus authentication features 52, and level 2.0 adds a voice identification feature and the above-described "pull message" feature. The levels are inclusive, that is, compliance with level 2.0 assumes compliance with levels 0.0 and 1.0. Furthermore, the versions of the nested levels are necessarily the same, that is, it is not possible to support level 2, version 3 (2.3) and level 1, version 0 (1.0).

Protocol B preferably strictly implements AMIS-A protocol 50, which is stored and used as the basis for building the features 52 and extended feature 54 enhancements.

Regarding authentication features 52 and extended voice messaging services 54, all extended features employ a protocol extension option (function=8) of AMIS-A protocol 50. In particular, authentication features 52 provide a bilateral authentication between the VMSFU and the voice message system, which is a precursor to actual delivery of enhanced features. After a requesting resource has been properly authenticated, enhanced feature service information transfer units are exchanged, including:

requesting voice identification of a voice message recipient;

requesting status of a voice mailbox including number of messages waiting, message priorities, and date message posted; and pulling voice messages from a specified mailbox for delivery elsewhere.

Additional message features can be added to upgrade AMIS-A protocol 50 for compatibility with many. AMIS-D features, such as providing delivery notification, message importance indication, message privacy, message priority, nonreceipt notification, receipt notification, message originator's voice name, service notification, an increased number of messages per call, an increased number of recipients per message, and an increased message length.

In implementing protocol B, it is preferred that voice message systems 16 or 18 accept from VMSFUs 22 and 24, service information transfer units for system authentication, level/version identification, level 1 and level 2 message delivery notifications, voice identification, and message identification number.

Voice message systems 16 and 18 may optionally accept from VMSFUs 22 and 24 service information transfer units for a voice authentication response, address list administration, subscriber profile administration, and mailbox status requests.

Preferably, voice message systems 16 and 18 must provide service information transfer units for system authentication and level/version identification and may optionally provide service information transfer units for voice signature identification (xx seconds of the sending user's voice), requesting message identification, address list administration, requesting voice authentication, subscriber profile administration, and mailbox status responses.

The preferred format for protocol B service information transfer units is:

| * | nn | 8 | FUN | MOD | DATA | CKSUM |

Where:

\* Is an escape sentinel.

nn Is a message length.

8 Is the AMIS-A protocol extensions function code.

FUN Is a two-digit function code.

MOD Is a two-digit function modifier code.

DATA Is optional data dependent on the values of FUN and MOD.

CKSUM Is a two-digit AMIS-A checksum.

Preferred function, modifier, and data field values for protocol B service information transfer units are defined below in Table 5.

TABLE 5

| FUN | MOD | DATA | SERVICE INFO TRANSFER UNIT |
|---|---|---|---|
| 01 | | | SERVICE DEFINITION |
| | 01 | | Level/version identification |
| | | MMNN | Version: MM major, NN minor. For example, 0203 is level 02, version 03. |
| | 02 | | System authentication unit |
| | | AAAAA | Authentication data |
| 02 | | | ADDRESS LIST ADMINISTRATION |
| 03 | | | SUBSCRIBER PROFILE ADMINISTRATION |
| 04 | | | MESSAGE SERVICE RELATED |
| | 01 | | Voice Authentication Request |
| | | NN | Length in seconds (Originator's voice name) |
| | 02 | | Voice authentication response |
| | | (CC . . .) | Certificate |
| | 03 | (ID . . .) | Message identification response Data is the global identification for this message |
| 05 | | | DELIVERY NOTIFICATION |
| | 01 | | Level 1 notification. |
| | 02 | | Level 2 notification |
| | 03 | | Receipt notification |
| | 04 | | Delivery notification |
| | 05 | | Message failure report |
| | 06 | | Message delivery report |
| 06 | 01 | | MESSAGE CHARACTERISTICS |
| | | Characteristics Field | Octets describing the message characteristics (see below) |
| 07 | | | MESSAGE MODIFICATION |
| | 01 | | Data = GMT time for delivery |
| | | SSGMT | SS = Scope 01 = This message only 02 = All messages in this communication GMT = time for delivery |
| 08 | | | MAILBOX RELATED |
| | 01 | | Mailbox status request |
| | | MMM MMM | Mailbox number |
| | 02 | SSS . . SSS | Mailbox status response |
| 09 | | | RECOVERY |
| | 01 | | Request resumption for message |
| | | (ID #) | Message ID for recovery process |
| | | (State) | Last valid State of protocol exchange (#delimited) |

The preferred format of the message characteristics data field is:

| BBBBPOOOLLVVVSSS . . . SSS#RR . . . RR#RRRR . . . |

Where:
BBBB bit significant field concatenation of the following:
　1=Delivery notification request
　2=Forward (redirect indication)
　4=Nonreceipt notification requested
　8=Message privacy requested
　16=Message ID requested
　32=Voice ID requested
　64=Voice signature present
P priority field
　0=no priority 1=urgent
2=routine
3=low
4=deferred
000 reserved for future use
LL length of the voice signature in seconds
VVV number of seconds of the voice message portion
SSSSS# originator mailbox number (#delimited)
RRR#RRR# recipient mailbox number(s) (#delimited)

Figure 5:
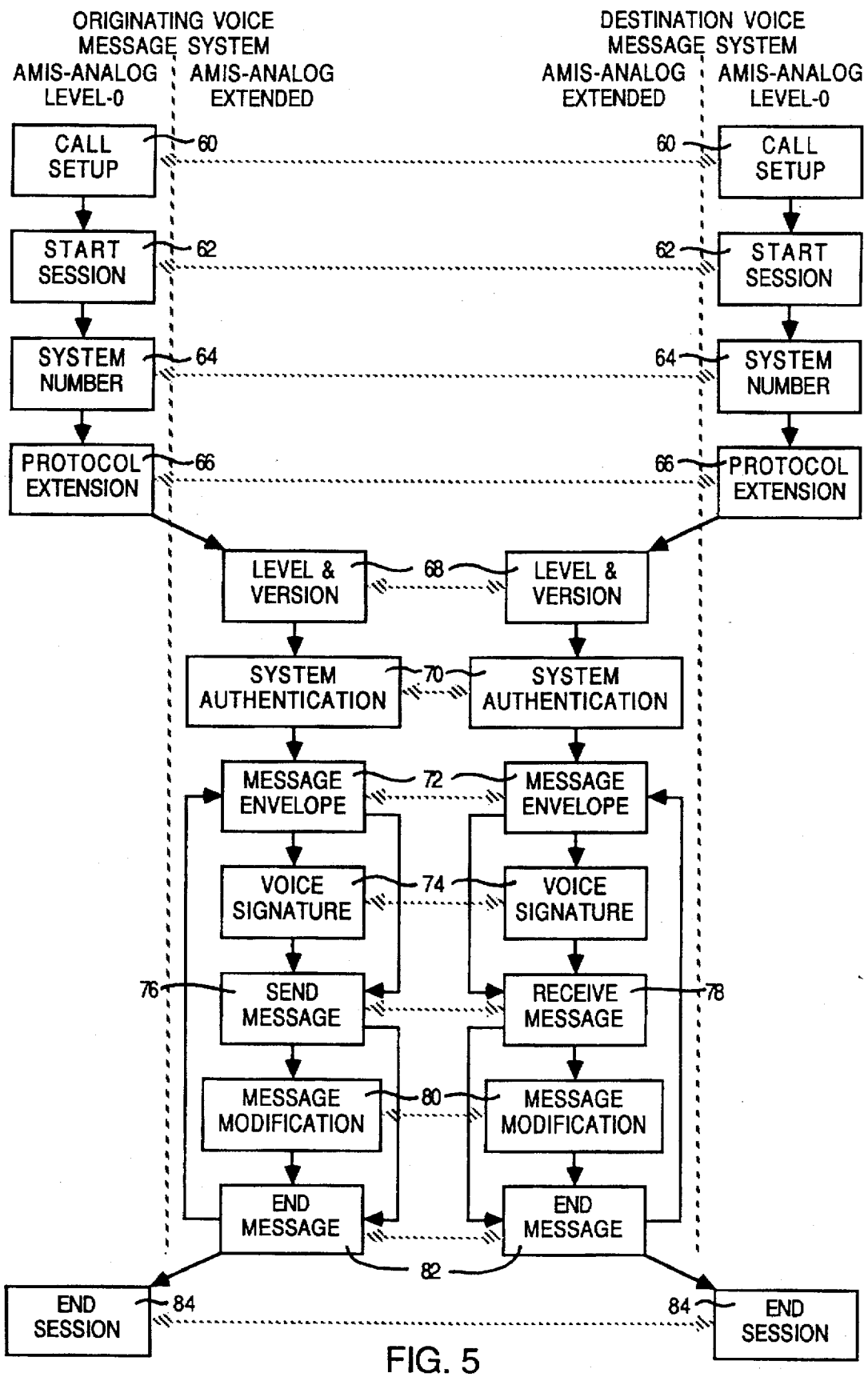
FIG. 5 is a flow diagram showing a series of protocol states that cause the exchange of message and control information according to this invention.

FIG. 5 shows the protocol B information flow states causing message and control information exchanges between voice message systems, such as 16 and 18, and associated respective VMSFUs 22 and 24. In the following description, voice message system 16 is an originating voice message system and voice message system 18 is a destination voice message system. Of course, the originating and destination roles may be reversed.

Protocol B starts with a sequence of four conventional AMIS-A states including a call setup state 60, a start session state 62, a system number state 64, and a protocol extension state 66 that causes protocol B to enter the AMIS-A extended features states.

The extended feature states include a level/version state 68 which causes an exchange of level and version information.

A system authentication state 70 causes an exchange of system number information for matching against authorization table information.

A message envelope state 72 causes an exchange of message characteristics and service information transfer units.

An optional voice signature state 74 appends the originating user's voice signature to the message envelope.

A send message state 76 transmits the originating voice message system message envelope to a receive message state 78 of the destination voice message system.

A optional message modification state 80 permits property modifications applied to a current message or to a group of messages by the originating voice message system to be properly interpreted by the destination voice message system.

An end message state 82 sends an end-of-message frame from the originating voice message system to the destination voice message system and causes both systems to enter an end session state 84.

Referring again to FIGS. 1 and 2, protocol C is used to transfer service information transfer units, such as address list administration data, voice authentication requests, voice identification requests, and accounting information transfer units, between VMSFUs 22 and 24 and administration service 28.

Protocol C is based on an existing digital messaging protocol, such as internet TCP/IP or OSI protocol layers .one to four.

Administration service 28 preferably accepts service information transfer units for system authentication, level/version identification, call records, voice identification requests, voice authorization requests, level 1 and level 2 notifications, address list administration, subscriber profile administration, and quality of service responses.

In like manner, administration service 28 preferably provides service information transfer units for system authentication, level/version identification, voice identification responses, deferred delivery requests, voice authentication responses, address list administration, subscriber profile administration, and quality of service requests.

The format of protocol C service information transfer units is the same as the format for protocol A.

Skilled workers will understand that many changes may be made to the details of the above-described embodiment of this invention without departing from the underlying principles thereof. For example, the protocols described may be employed to convey, for example, nonvoice audio information and video information.

Accordingly, it will be appreciated that this invention is also applicable to communications applications other than those found in voice-based message communication systems. The scope of this invention should, therefore, be determined only by the following claims.

I claim:

1. In a voice message store and forward service, a method of conveying a voice message between an originating voice message system employing a first set of features and intercommunicating employing a first protocol and a destination voice message system employing a second set of features, comprising:

providing an originating voice message store and forward unit (VMSFU) and a destination VMSFU that intercommunicate employing a second protocol to convey the voice message and information identifying the first set of features;

transmitting the voice message and the information identifying the first set of features from the originating voice message system employing the first protocol;

receiving the voice message at the originating VMSFU;

storing the received voice message in a deferred message store connected to the originating VMSFU;

grouping the received message together with other voice messages;

conveying the grouped voice messages and the information identifying the first set of features from the originating VMSFU to the destination VMSFU employing the second protocol, the conveying occurring at a deferred time determined by a scheduler to minimize costs; and delivering the voice message from the destination VMSFU to the destination voice message system.

2. The method of claim 1 in which the first protocol conforms to an analog messaging interchange specification ("AMIS-A") and further includes notifying the originating voice message system whether the voice message was successfully transferred to the destination voice message system.

3. The method of claim 2 in which the notifying step includes indicating to the originating VMSFU that the voice message was not successfully transferred to the destination VMSFU, and redirecting the voice message to an alternate VMSFU.

4. The method of claim 1 in which the first protocol is an analog protocol and the second protocol is a digital protocol.

5. The method of claim 4 in which the first protocol employs functionality extensions of an analog messaging interchange specification protocol.

6. The method of claim 4 in which the second protocol includes one of an International Telecommunications Union X.400 protocol, a digital messaging interchange specification protocol, a MIME protocol, and a SMTP protocol.

7. The method of claim 1 in which the conveying and delivering steps are carried out in accordance with the information identifying the first set of features.

8. The method of claim 7 in which the information identifying the first set of features includes at least one of a message delivery time, at least one destination address, a message priority, and a class of service.

9. In a voice message store and forward service, a method of conveying a voice message between an originating voice message system employing a first set of features and intercommunicating employing a first protocol and a destination voice message system employing a second set of features, comprising the steps of:

providing an originating voice message store and forward unit (VMSFU) and a destination VMSFU that intercommunicate employing a second protocol that includes a user information transfer unit to convey the voice message, information identifying the first set of features, and a service information transfer unit to convey a notification indicative of whether the voice message was successfully transferred;

transmitting the voice message from the originating voice message system employing the first protocol;

receiving the voice message at the originating VMSFU;

storing the received voice message in a deferred message store connected to the originating VMSFU;

grouping the received voice message together with other voice messages;

deferring conveying the grouped voice messages until a time determined by a scheduler to minimize costs associated with conveying the grouped voice messages;

conveying at the time determined by the scheduler the grouped voice messages and the information identifying the first set of features from the originating VMSFU to the destination VMSFU employing the second protocol;

delivering the voice message from the destination VMSFU to the destination voice message system via the second set of features; and returning to the originating voice message system a notification indicative of whether the voice message was successfully delivered to the destination voice message system.

10. In a voice message store and forward service, a method of conveying a voice message between an originating voice message system and a destination voice message system, comprising the steps of:

providing an originating voice message store and forward unit (VMSFU) and a destination VMSFU that intercommunicate employing a first protocol that conveys the voice message;

transmitting the voice message from the originating voice message system to the originating VMSFU;

storing the voice message in a deferred message store connected to the originating VMSFU;

grouping the voice message together with other voice messages;

deferring conveying the grouped voice messages until a time determined by a scheduler to minimize costs associated with conveying the grouped voice messages;

conveying employing the first protocol the grouped voice messages from the originating VMSFU to the destination VMSFU at the time determined by the scheduler; and delivering the voice message from the destination VMSFU to the destination voice message system.

11. The method of claim 10 in which the originating voice message system and the originating VMSFU intercommunicate employing a second protocol that conforms to an analog messaging interchange specification ("AMIS-A") and further includes notifying the originating voice message system whether the voice message was successfully transferred to the destination voice message system.

12. The method of claim 11 in which the notifying step includes indicating to the originating VMSFU that the voice message was not successfully transferred to the destination VMSFU, and redirecting the voice message to an alternate VMSFU.

13. The method of claim 11 in which the first protocol is a digital protocol.

14. The method of claim 13 in which the second protocol employs functionality extensions of the analog messaging interchange specification protocol.

15. The method of claim 13 in which the first protocol includes one of an International Telecommunications Union X.400 protocol, a digital messaging interchange specification protocol, a MIME protocol, and a SMTP protocol.

16. The method of claim 14 in which the functionality extensions convey information identifying at least one of a voice message delivery time, at least one destination address, a message priority, and a class of service.

* * * * *